(12) United States Patent
Keller

(10) Patent No.: US 8,025,240 B2
(45) Date of Patent: *Sep. 27, 2011

(54) RADIANT HEAT FLOORING SYSTEM

(75) Inventor: James Keller, Gloversville, NY (US)

(73) Assignee: Keller Komfort Radiant Systems, Inc., Fonda, NY (US)

( * ) Notice: Subject to any disclaimer, the term of this patent is extended or adjusted under 35 U.S.C. 154(b) by 1377 days.

This patent is subject to a terminal disclaimer.

(21) Appl. No.: 11/550,977

(22) Filed: Oct. 19, 2006

(65) Prior Publication Data

US 2008/0148673 A1   Jun. 26, 2008

(51) Int. Cl.
F24D 3/14 (2006.01)
F24D 3/12 (2006.01)

(52) U.S. Cl. .......... 237/69; 52/177; 52/483.1; 52/489.1; 165/47; 165/48.1; 165/49; 165/50; 219/213

(58) Field of Classification Search ............... 237/69; 52/177, 220.1, 220.2, 483.1, 489.1; 165/47, 165/48.1, 49, 50, 53; 219/213; 454/185, 454/186; 174/50, 50.51, 481, 482; 229/124, 229/125.01

See application file for complete search history.

(56) References Cited

U.S. PATENT DOCUMENTS

| | | | | |
|---|---|---|---|---|
| 1,913,342 A * | 6/1933 | Schaffert | 52/588.1 |
| 2,102,231 A * | 12/1937 | Zoettl | 52/435 |
| 2,799,481 A * | 7/1957 | Becker | 165/171 |
| 3,037,746 A | 6/1962 | Williams | 257/124 |
| 3,636,412 A * | 1/1972 | Simovits et al. | 361/119 |
| 4,080,703 A | 3/1978 | Beck, Jr. | 29/157.3 C |
| 4,186,795 A * | 2/1980 | Platell | 165/53 |
| 4,301,859 A * | 11/1981 | Hollemann | 165/49 |
| 4,369,836 A * | 1/1983 | Bleckmann | 165/171 |
| 4,424,656 A | 1/1984 | LaVanture | 52/584 |
| 4,635,710 A * | 1/1987 | Shelley | 165/49 |
| 4,759,402 A | 7/1988 | Osojnak | 165/56 |
| 4,764,675 A * | 8/1988 | Levy et al. | 250/324 |
| 4,766,951 A * | 8/1988 | Bergh | 165/56 |
| 5,042,569 A * | 8/1991 | Siegmund | 165/56 |
| 5,454,428 A * | 10/1995 | Pickard et al. | 165/49 |
| 5,459,810 A | 10/1995 | Villa | 392/352 |
| 5,597,033 A | 1/1997 | Cali | 165/55 |
| 5,743,330 A | 4/1998 | Bilotta et al. | 165/183 |
| 5,788,152 A | 8/1998 | Alsberg | 237/69 |
| 5,799,723 A | 9/1998 | Sokolean | 165/49 |

(Continued)

FOREIGN PATENT DOCUMENTS

DE   3932972 A1 * 4/1991

(Continued)

*Primary Examiner* — Steven B McAllister
*Assistant Examiner* — Daniel E Namay
(74) *Attorney, Agent, or Firm* — Heslin Rothenberg Farley & Mesiti P.C.; Nicholas Mesiti, Esq.; Victor A. Cardona, Esq.

(57) ABSTRACT

A flooring system for radiant heating includes a top floor portion and a subfloor portion. The top portion is releasably connectable to the subfloor portion in a vertical direction substantially perpendicular to a walking surface of the top portion. The top portion includes a bottom side and top channel portion downwardly depending from the bottom side. The subfloor portion includes a top side and a bottom channel portion extending upwardly from the top side. The top channel portion and the bottom channel portion bound a channel for receiving a heating conduit. The channel extends longitudinally relative to the top floor portion and the subfloor portion.

11 Claims, 8 Drawing Sheets

U.S. PATENT DOCUMENTS

| | | | |
|---|---|---|---|
| 5,862,854 A | 1/1999 | Gary | 165/55 |
| 5,879,491 A * | 3/1999 | Kobayashi | 156/71 |
| 5,930,962 A | 8/1999 | Sokolean | 52/220.1 |
| 6,073,407 A | 6/2000 | Sokolean | 52/302.1 |
| 6,092,587 A | 7/2000 | Ingram | 165/56 |
| 6,115,981 A * | 9/2000 | Counihan | 52/403.1 |
| 6,199,340 B1 * | 3/2001 | Davis | 52/592.1 |
| 6,220,523 B1 * | 4/2001 | Fiedrich | 237/69 |
| 6,283,382 B1 | 9/2001 | Fitzemeyer | 237/69 |
| 6,330,980 B1 | 12/2001 | Fiedrich | 237/69 |
| 6,526,704 B1 | 3/2003 | Berard et al. | 52/177 |
| 6,647,690 B1 * | 11/2003 | Martensson | 52/601 |
| 6,726,115 B1 | 4/2004 | Chiles et al. | 237/69 |
| 6,739,097 B1 * | 5/2004 | Rodin | 52/71 |
| 6,903,265 B1 * | 6/2005 | VanderVelde et al. | 174/481 |
| 6,910,526 B1 | 6/2005 | Sokolean | 165/56 |
| 7,114,302 B2 * | 10/2006 | Tanase et al. | 52/220.1 |
| 7,748,176 B2 * | 7/2010 | Harding et al. | 52/177 |
| 2003/0009973 A1 * | 1/2003 | Lee | 52/589.1 |
| 2003/0140581 A1 * | 7/2003 | Ludington | 52/177 |
| 2004/0031590 A1 | 2/2004 | Vilia | 165/81 |
| 2006/0070319 A1 * | 4/2006 | Flynn | 52/220.8 |
| 2007/0017656 A1 * | 1/2007 | Da Rold | 165/48.1 |
| 2007/0277453 A1 * | 12/2007 | Trageser et al. | 52/177 |
| 2010/0155133 A1 * | 6/2010 | Makwinski et al. | 174/481 |

FOREIGN PATENT DOCUMENTS

| | | | |
|---|---|---|---|
| EP | 17846 A2 * | 10/1980 | |
| EP | 133556 A2 * | 2/1985 | |
| JP | 52009954 A * | 1/1977 | |
| JP | 56030589 A * | 3/1981 | |
| JP | 56030590 A * | 3/1981 | |
| JP | 62005026 A * | 1/1987 | |
| WO | WO 2004072406 A1 * | 8/2004 | |

* cited by examiner

RADIANT HEAT FLOORING SYSTEM

FIELD OF THE INVENTION

The present invention relates to flooring systems and in particular systems and methods for radiant heat flooring systems.

BACKGROUND OF THE INVENTION

Radiant heating systems for flooring heat the floor of a dwelling, office, or other building, which then heat the habitable space thereof. The warm floors resulting from hot water conduits contacting the flooring also directly warm the feet or other part of the body of a person coming into contact with such flooring. Tile, hardwood floors or other esthetically desirable materials are typically used for flooring in combination with radiant heating systems. The radiant heating conduits are usually located on an opposite side of the flooring relative to a walking surface thereof. The conduits are thus usually installed and maintained in an area (e.g., a basement) which is not directly accessible to the inhabited space on the side of the walking surface of the flooring. Often, insulation is desirable to inhibit heat from the heated space from transferring toward an unheated space or the ambient environment. Insulation is thus usually placed over such heating conduits and must be removed in the event that maintenance or other access is desired relative to the heating conduits. In a typical radiant floor heating system, the conduits are attached via brackets to the underside of floorboards such that they are not easily removed therefrom in the event that maintenance or replacement is desired.

Thus, a need exists for radiant floor heating systems which are aesthetically attractive, easily maintainable, and energy efficient.

SUMMARY OF THE INVENTION

The present invention provides, in a first aspect, a flooring system for radiant heating which includes a top floor portion and a subfloor portion. The top portion is releasably connectable to the subfloor portion in a vertical direction substantially perpendicular to a walking surface of the top portion. The top portion includes a bottom side and a top channel portion downwardly depending from the bottom side. The subfloor portion includes a top side and a bottom channel portion extending upwardly from the bottom side. The top channel portion and the said bottom channel portion bound a channel for receiving a heating conduit, and the channel extends longitudinally relative to the top floor portion and the subfloor portion.

The present invention provides, in a second aspect, a flooring system which includes a top floor portion having a top side with decorative finish directly applied thereto, and a subfloor portion. The top portion is releasably connectable to the subfloor portion in a vertical direction substantially perpendicular to a walking surface of the top portion. The top portion is releasable from the subfloor portion such that removal of the decorative finish from the top floor portion is avoided.

The present invention provides, in a third aspect, a flooring system for radiant heating which includes a top floor portion and a subfloor portion. The top portion includes a bottom side and a top channel portion downwardly dependent from the bottom side. The bottom portion includes a top side and a bottom channel portion extending upwardly from the bottom side. The top channel portion and the bottom channel portion bound a channel for receiving a heating conduit. The top channel portion includes a bottommost side closest to the bottom channel portion and the bottom channel portion includes an uppermost side closest to the top channel portion. The bottommost side and the uppermost side bound a space configured to allow the top channel portion and the bottom channel portion to move vertically relative to each other into the space.

The present invention provides, in a fourth aspect, a flooring system for radiant heating which includes a top floor portion and a sub floor portion. The top floor portion includes a bottom side and the bottom portion includes a top side. A receiving cavity between the top portion and the bottom portion is configured to receive a heating conduit. The bottom portion includes a lower side having an insulation slot.

DETAILED DESCRIPTION OF THE INVENTION

In accordance with the principals of the present invention, a radiant heat flooring system and methods for radiant floor heating are provided.

Figure 1:
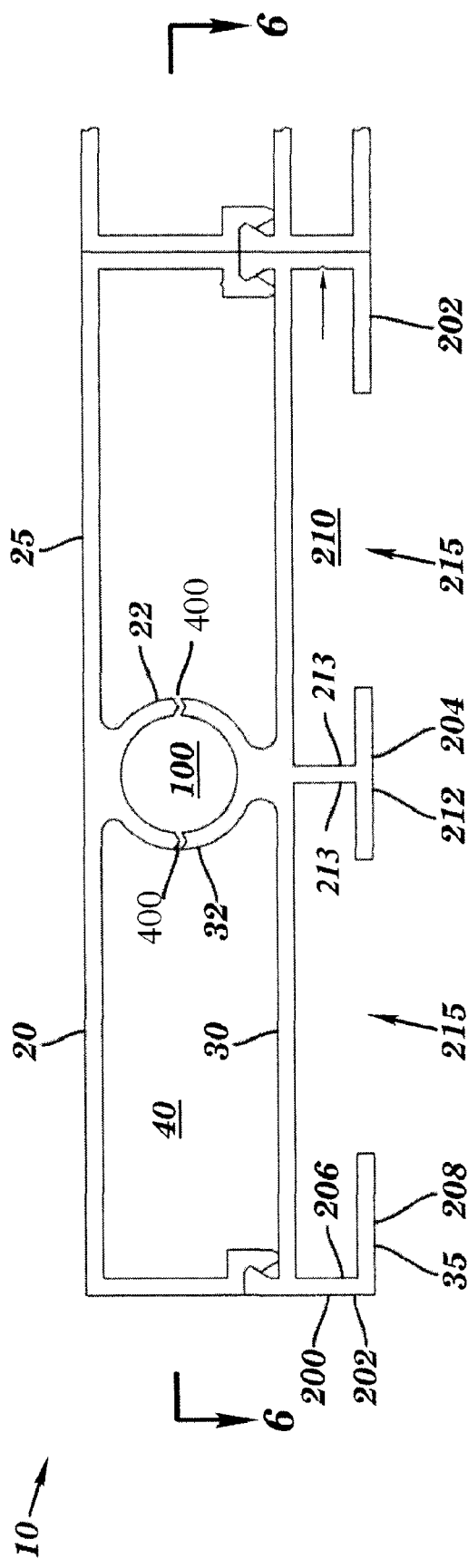
FIG. 1 is a side elevational view of a radiant heat flooring system in accordance with the present invention.

In an exemplary embodiment depicted in FIG. 1, a flooring system 10 includes a top flooring portion 20 and a subfloor portion 30 for supporting the top portion. A top surface 25 of top portion 20 is utilized in a manner similar to a top surface of typical flooring, e.g., for walking, sitting and supporting furniture. A bottom surface 35 of subfloor portion 30 is utilized in a manner similar to a typical subfloor material, e.g., placed on floor joists such as floor joists 300 (FIGS. 6-7), slab foundations or other such flooring support to support flooring placed thereon and/or attached thereto. Multiple instances of system 10 may be located adjacent one another to form a floor on such flooring support as depicted for example in FIGS. 6-7.

Figure 2:
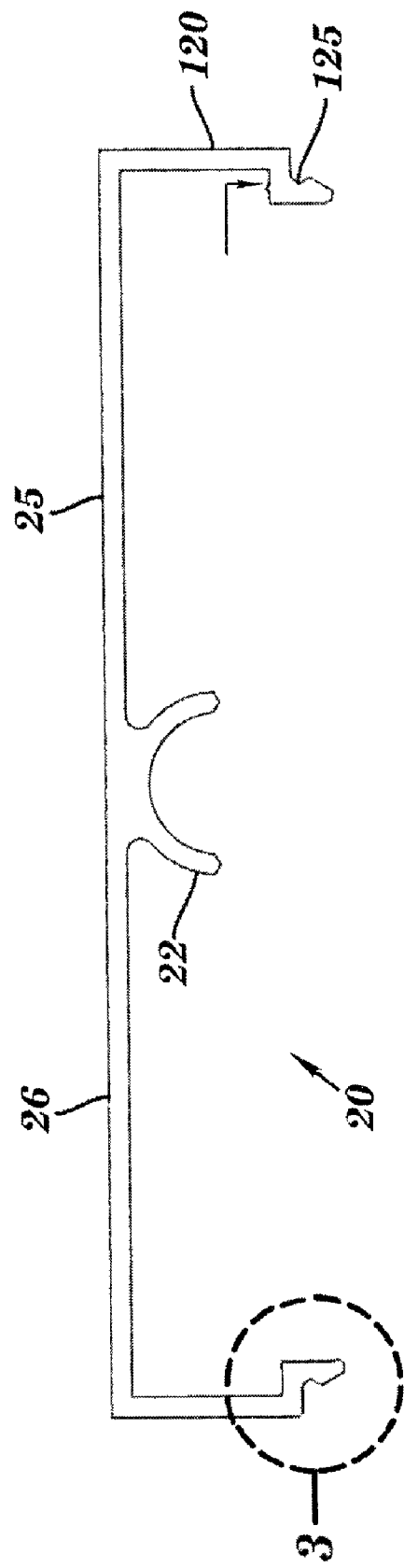
FIG. 2 is a side elevational view of a top floor portion of the flooring system of FIG. 1.
Figure 3:
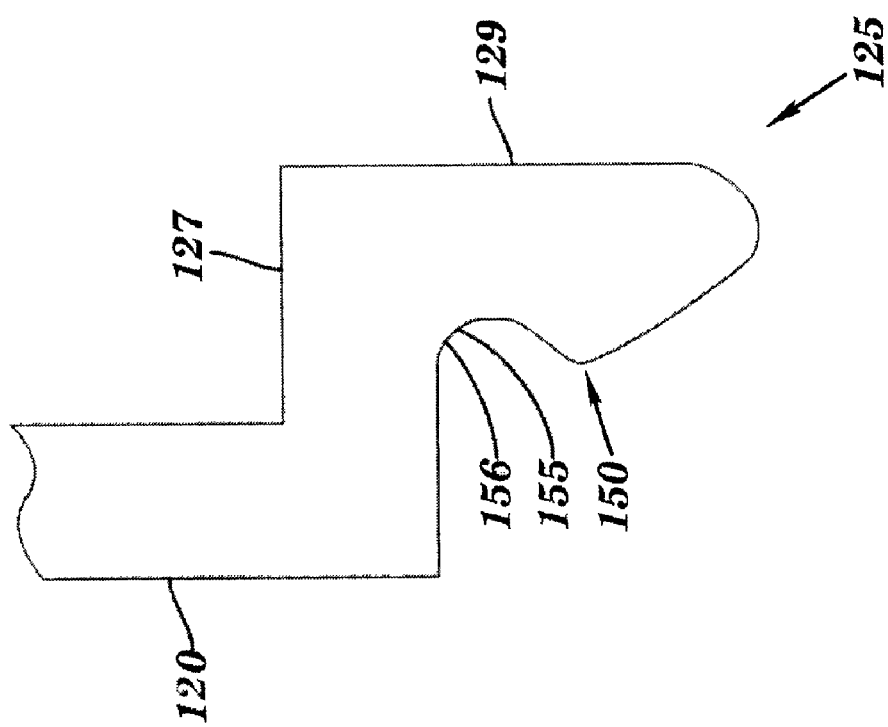
FIG. 3 is a side elevational view of a connecting portion of the top floor portion of FIG. 2.
Figure 4:
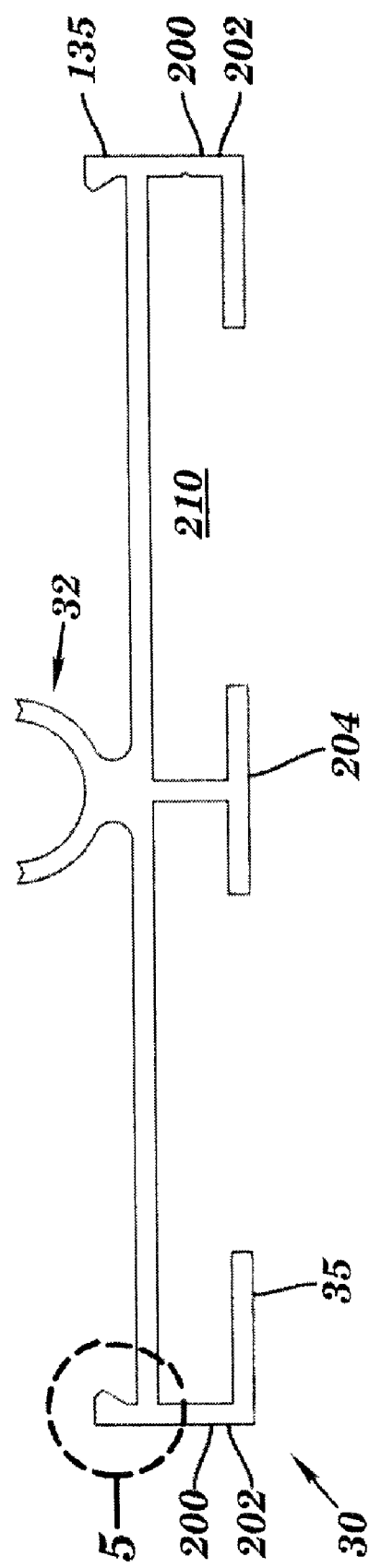
FIG. 4 is a side elevational view of a subfloor portion of the flooring system of FIG. 1.
Figure 5:
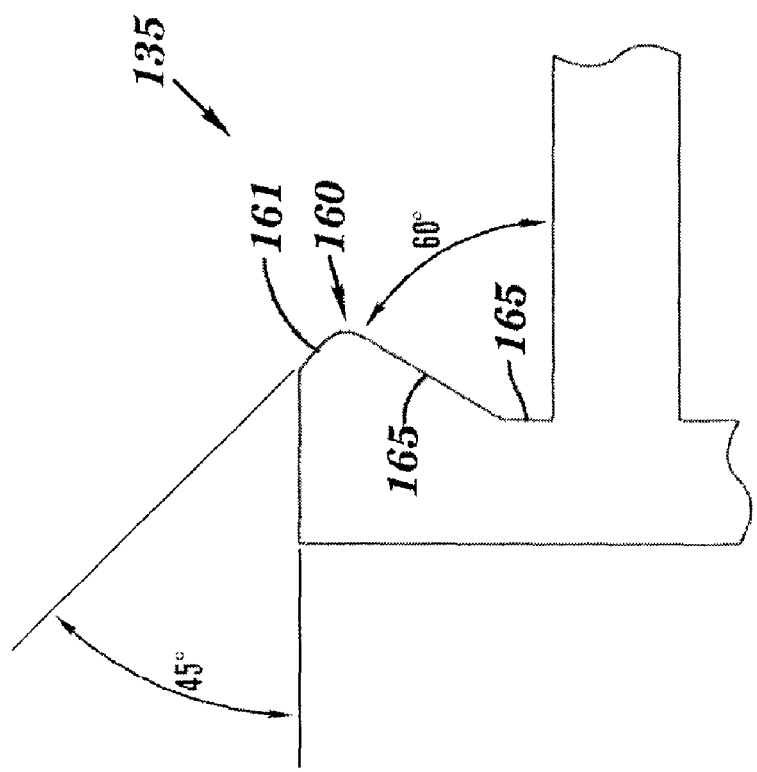
FIG. 5 is a side elevational view of a connecting portion of the subfloor portion of FIG. 4.

Top portion 20 is releasably connected to bottom portion 30 to allow access to a cavity 40 therebetween. As depicted in FIGS. 2-4, top portion 20 and bottom portion 30 include engaging or connecting portions to allow such releasable connection. As best depicted in FIGS. 2-3 top portion 20 includes side portions 120 bounding cavity 40 and having downwardly depending connecting portions 125 for engagement with upwardly extending connecting portions 135 (FIGS. 4-5) of subfloor portion 30. Each of connecting portions 125 includes a horizontal portion 127 and a vertical portion 129 having a horizontally protruding portion 150. A groove 155 is present above horizontally protruding portion 150 and is configured (e.g., shaped and dimensioned) to receive a horizontally protruding portion 160 (FIG. 5) of one of upwardly extending connecting portions 135 (FIGS. 4-5). As best depicted in FIGS. 1, 3 and 5, the connecting portions (e.g. connecting portions 125 and 135) have complementary shapes to allow them to engage with each other to releasably connect top portion 20 to subfloor portion 30.

Figure 6:
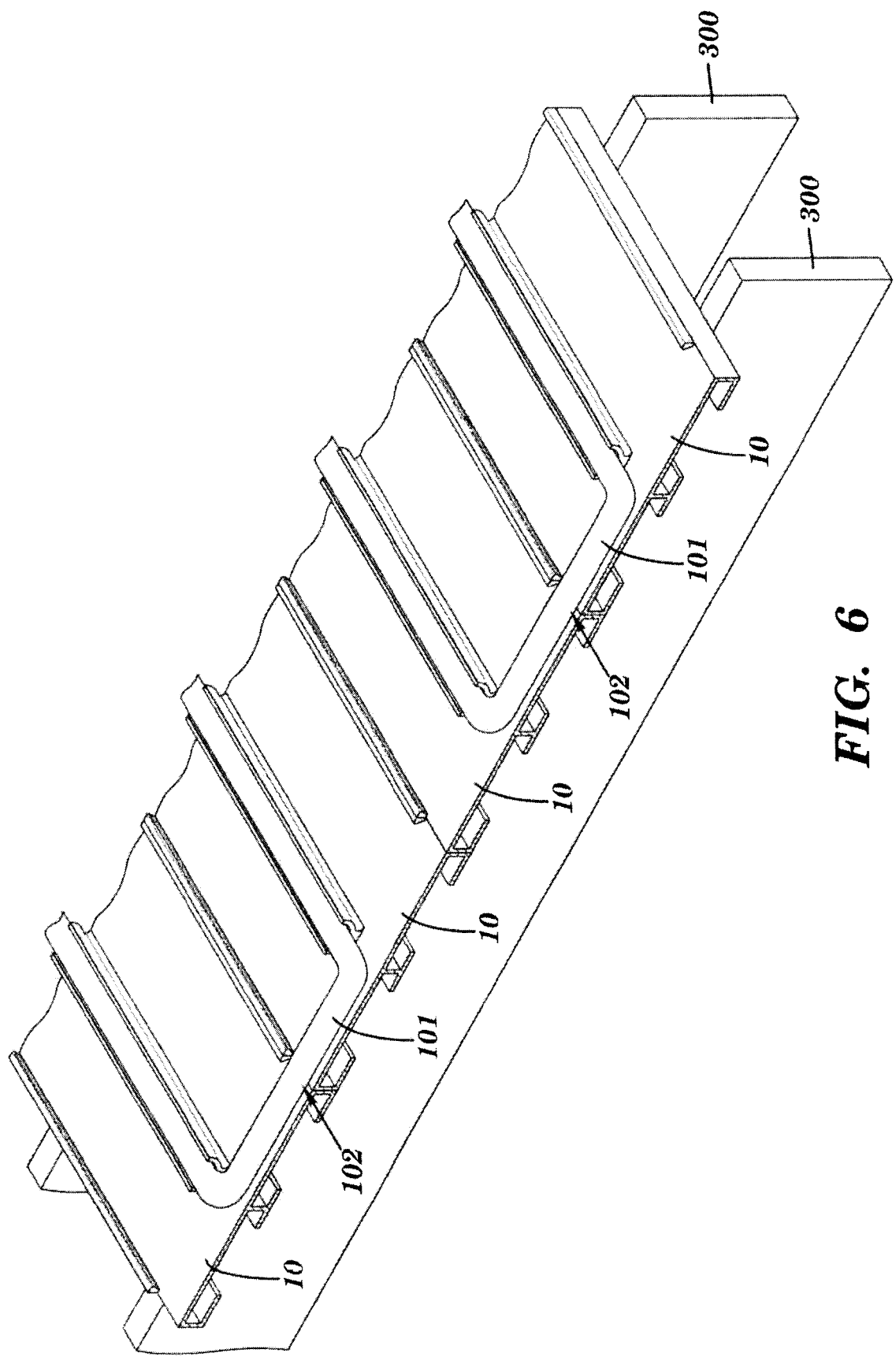
FIG. 6 is a top cross sectional view of several radiant floor heating systems adjacent one another taken along lines 6-6 of FIG. 1.
Figure 7:
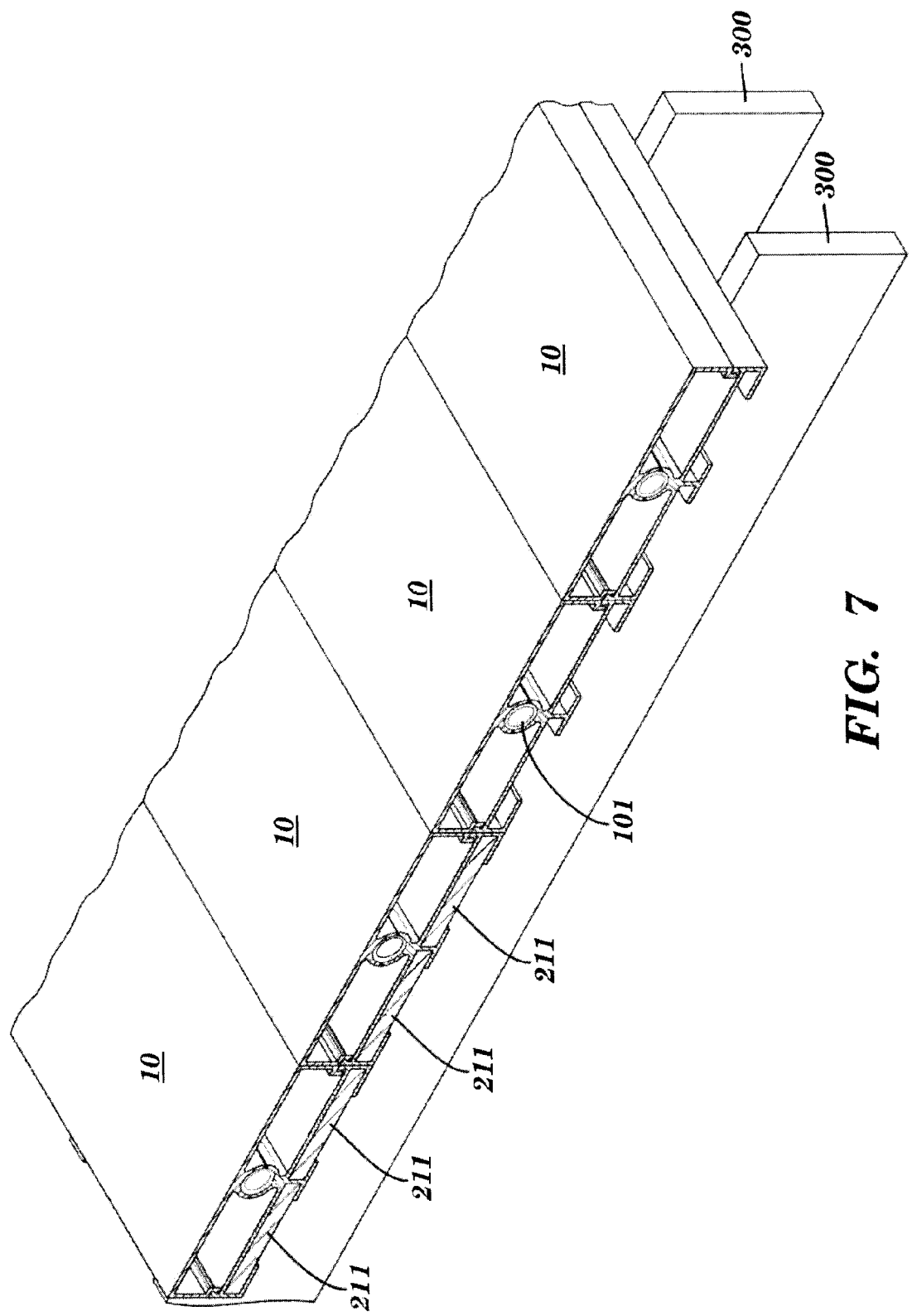
FIG. 7 is a perspective view of multiple radiant heat flooring system installed adjacent one another on multiple floor joists.

Flooring system 10 may also include a channel 100 for receiving a radiant heating conduit 101 in cavity 40 as depicted in FIGS. 1 and 6, for example. The conduit could be a flexible plastic conduit, copper pipe, or any other pipe or conduit configured to be used for radiant heating systems. Top portion 20 may include a downwardly depending top channel portion 22 and subfloor portion 30 may include an upwardly extending bottom channel portion 32 which together bound and define channel 100. When assembled as depicted in FIG. 1, a space 400 may be present between the channel portions (i.e., top channel portion 22 and bottom channel portion 32) on one or both longitudinal sides of channel 100. The space may define the channel portions as arcuate portions having equal arcuate dimensions. Such space may allow a flexing of top floor portion 20 toward subfloor portion 30 in response to a weight (e.g., a person walking) being placed on top floor portion 20. This flexing may be more comfortable to a person walking on top surface 25 due to the 'give' or deflection provided by the movement of top portion 20 relative to subfloor portion 30. Also, the space (e.g., space 200) between the channel portions may facilitate heat transfer via the moving of air from the channel (e.g., channel 100) through the space to the remainder of the cavity (e.g., cavity 40) between top floor portion 20 and subfloor portion 30. The spaces may be longitudinally intermittent or continuous along the longitudinal sides of channel 100.

As described above, the connecting portions (e.g., connecting portions 125 and 135, FIGS. 3 and 5) have complementary shapes to allow them to engage with each other. For example, horizontally extending portion 160 may have an outer surface 161 which is angled such that it is parallel to an inner surface 156 of groove 155. Further, each connecting portion is elastically deformable (e.g., portion 125 may rotate inwardly toward channel 100 and portion 160 may rotate outwardly away from channel 100) to allow the horizontally protruding portions to move past each other such that for each pair of connecting portions, horizontally extending portion 160 may be received in groove 155 and horizontally extending portion 150 may abut an engaging surface 165 of one of upwardly extending connecting portions 135. This movement may cause top portion 20 and subfloor portion 30 to 'snap' together and therefore to inhibit separation to a degree not exceeding that which a typical person could exert to free top portion 20 from bottom portion 30. For example, top portion 20 may be detachable from subfloor portion 30 in a direction substantially perpendicular to top surface 25 and/or bottom surface 35. Such releasability may facilitate any maintenance or investigation relative to a conduit (not shown) which may be located in channel 100 and/or cavity 40.

Subfloor portion 30 includes legs 200 which may depend downwardly and extend horizontally to at least partially bound an insulation slot or cavity 210 as depicted in FIGS. 1 and 4. For example, each subfloor portion may include side legs 202 and a central leg 204. Legs 202 may include vertical portions 206 and horizontal portions 208. Central leg 204 may include vertical portion 213 and horizontal portion 212. Each of the cavities 210 between the side legs and the center leg may hold insulation 211 (FIG. 7) therein which may be of any type (e.g., fiberglass, polystyrene foam) which inhibits heat transfer from top surface 25 toward bottom surface 35 or vice versa. Such insulation may make flooring made of multiple adjacent floorboards of systems 10 more comfortable to a person walking, sitting or otherwise being located on a side of system 10 closest to top surface 25 by inhibiting heat transfer to or from a side of the flooring opposite the insulation. Also, openings 215 may allow the insulation to be inserted into, and removed from, cavities 210.

In one example, top surface 25 may include a finish 26 applied directly thereto. This finish may be decorative and could include an image to make top surface 25 appear to be wood, ceramic tile or another desired flooring material. The finish may be formed from a plastic film or other coating directly applied to top surface 25, which may be heated and/or otherwise treated to inhibit removal of such finish from the top surface. Further, the finish may include wood, leather, or laminate materials which may be bonded directly to top surface 25 such that the finish is non-separable relative to top surface 25.

Figure 8:
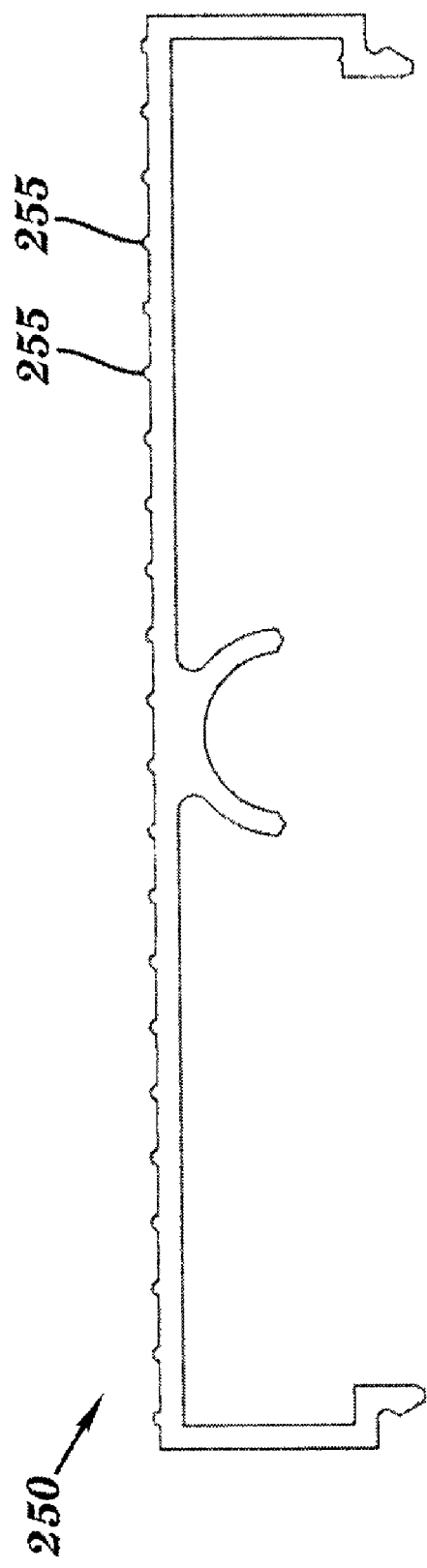
FIG. 8 is a side elevational view of another embodiment of a top flooring portion in accordance with the present invention, which includes projections on the top surface of the top flooring portion.

Such finish could also include a textured surface 250 having a three-dimensional surface such as vertical projections 255 as depicted in FIG. 8. For example, such projections could aid traction for a person walking on surface 25, e.g., when it rains, snows or is otherwise slippery, the person may gain traction walking on the projections. The projections may also promote heat transfer due to the increased surface area provided by the sides (e.g., longitudinal) of the projections. Any number of additional textures or images may also be included in the top surface to enhance the visual and/or function appeal thereof.

As will be evident to one skilled in the art, finish 26 is applied to top surface 25 of top portion 20, which may be releasably connectable to subfloor portion 30. For example, top portion 20 may be releasable from subfloor portion 30 after subfloor portion 30 is attached to floor joists, concrete or another means for support during a floor installation and that finish 26 is also releasable along with the remainder of top portion 10.

System 10 (e.g., including top portion 20 and subfloor portion 30) may be made of any materials (e.g., powder coated aluminum) which may support the weight required by a typical floor and which is elastically deformable to allow the releasable connection of top portion 20 to subfloor portion 30. System 10 (e.g., top floor portion 20 and bottom flooring portion 30) may be formed of extruded aluminum, for example.

Also, relative to the channels (e.g., channel 100) which receive heating conduits, portions of upwardly extending portion 32 and/or downwardly depending portion 22 may be absent (e.g., removed) resulting in connecting passages 102 which allow such conduits (e.g., conduits 101) to run between channels (e.g., channel 100) of adjacent flooring system(s) 10 as depicted for example in FIG. 6. Heat transfer fluid may thus flow between adjacent channels through such connecting passages among multiple flooring systems 10. Further, each system 10 could include multiple channels (e.g. channel 100) having multiple upwardly extending bottom channel portions 32 and downwardly depending top channel portions 22 within cavity 40. Also, such heating conduits may include a heat transfer fluid (e.g., water) for heating which is at a reduced temperature relative to a typical 160 degrees in typical radiant heating systems. The lower temperature which may be utilized in radiant heat flooring systems is possible due to the materials used (e.g., powder coated aluminum) and the insulation which may be found in an insulation slot 200 thereof to inhibit heat transfer from a heated area toward a non-heated one.

System 10 may be utilized as noted for flooring for both residential and commercial purposes. Also, system 10 may be utilized outside, for example, as decking. The ability to convey heat transfer fluids may be particularly useful to inhibit ice formation or to warm an area outside to allow people to remain outside on a deck when the ambient air would otherwise make it uncomfortably cold. It will also be understood by one skilled in the art that system 10 could be utilized for cooling through the use of cool fluids flowing through conduits received in cavity 40. Further, it will be understood to one skilled in the art that system 10 could be used in applications other than floors. For example, system 10 could be utilized on the walls or ceiling of residential and commercial buildings.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A flooring system for radiant heating comprising:
    a top floor portion and a subfloor portion;
    said top floor portion releasably connectable to said subfloor portion in a vertical direction substantially perpendicular to a walking surface of said top portion to form a cavity area bounded by said top floor portion and said subfloor portion, said top portion comprising a bottom side and a top channel portion downwardly depending from said bottom side; and
    said subfloor portion comprising a top side and a bottom channel portion connected to and extending upwardly from said top side toward a bottom of said top channel portion, said top channel portion and said bottom channel portion being separable from one another and having interior surface, the interior surface of said top channel portion and said bottom channel portion together defining an outer extent of a channel receiving a heating conduit, said channel extending longitudinally relative to said top floor portion and said subfloor portion and defining a channel area located within but separate from said cavity area.

2. The system of claim 1 wherein said top channel portion comprises a bottommost side closest to said bottom channel portion and said bottom channel portion comprises an uppermost side closest to said top channel portion and further comprising a space between said bottommost side and said uppermost side to allow said top channel portion and said bottom channel portion to move vertically relative to each other into said space.

3. The system of claim 1 wherein said top channel portion comprises an arcuate portion and said bottom channel comprises an arcuate portion, said top channel portion and said bottom channel portion vertically aligned to form said channel.

4. The system of claim 1 wherein said subfloor portion comprises an underside having an insulation slot.

5. The system of claim 4 wherein said underside comprises a plurality of legs bounding said slot.

6. The system of claim 5 wherein said plurality of legs depend downwardly substantially perpendicular to said walking surface and extend horizontally substantially parallel to said walking surface.

7. The system of claim 6 wherein said underside comprises a plurality of openings configured to allow insulation to be inserted into said slot.

8. The system of claim 1 wherein said top portion and said subfloor portion comprise releasable interlocking horizontal portions extending toward each other to allow said top portion and said subfloor portion to releasably connect to each other.

9. The system of claim 8 wherein said horizontal portions comprise barbs configured to releasably interlock to allow said top portion and said subfloor portion to releasably connect to each other.

10. A flooring system for radiant heating comprising:
    a top floor portion and a subfloor portion;
    said top floor portion releasably connectable to said subfloor portion in a vertical direction substantially perpendicular to a walking surface of said top portion to form a cavity area bounded by said top floor portion and said subfloor portion, said top portion comprising a bottom side and a top channel portion downwardly depending from said bottom side; and
    said subfloor portion comprising a top side and a bottom channel portion connected to and extending upwardly from said top side toward a bottom of said top channel portion, said top channel portion and said bottom channel portion being separable from one another and having interior surface, the interior surface of said top channel portion and said bottom channel portion together defining an outer extent of a channel means for receiving a heating conduit, said channel means extending longitudinally relative to said top floor portion and said subfloor portion and defining a channel area located within but separate from said cavity area.

11. The flooring system of claim 10 wherein said channel means comprises a circular cross-section.

* * * * *